Patented Nov. 14, 1939

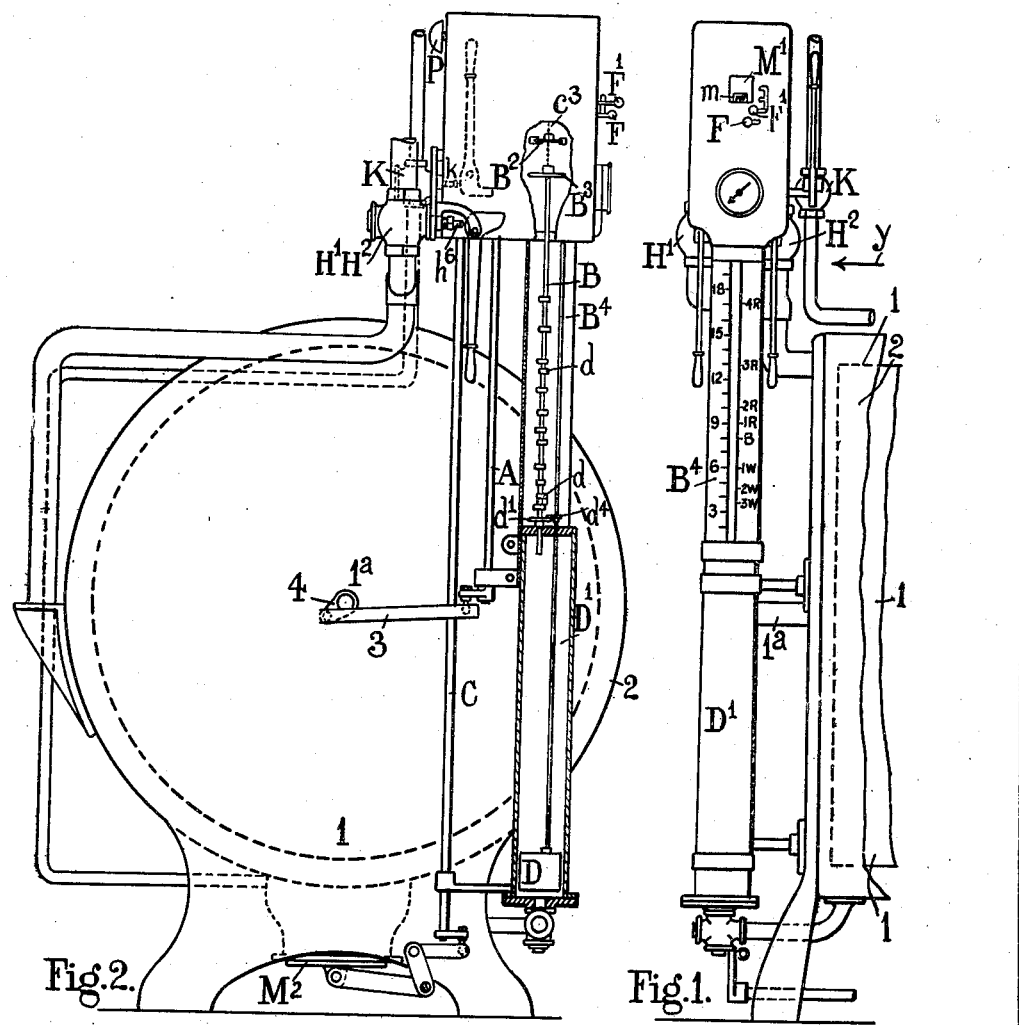

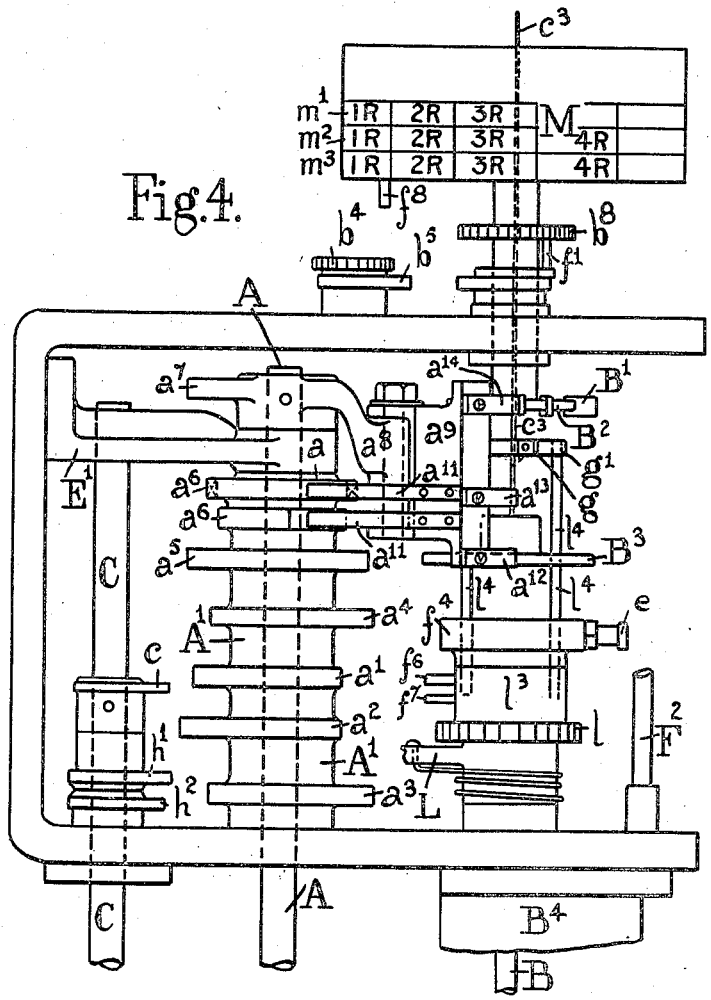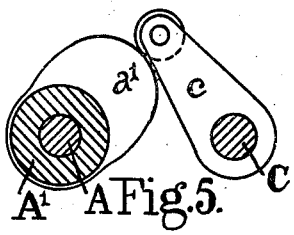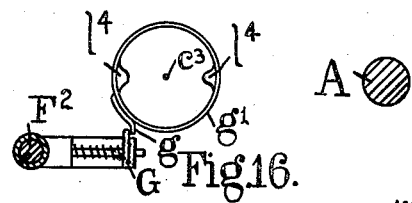

2,180,035

UNITED STATES PATENT OFFICE 2,180,035

MEANS FOR CONTROLLING THE TIMING AND SEQUENCE OF OPERATIONS IN LAUNDRY MACHINES AND THE LIKE

William George Cleghorn, Claygate, England, assignor to Isaac Braithwaite & Son Engineers Limited, Kendal, England Application April 15, 1936, Serial No. 74,468
In Great Britain April 26, 1935

9 Claims. (Cl. 137—68)

This invention relates to improvements in means for controlling the timing and sequence of operations in machines such as laundry washing machines, dyeing machines, bleaching machines and similar machines in which articles after having been placed therein are subjected to a series of operations or processes.

It has already been proposed to provide laundry washing machines and similar machines in which a series of operations are performed in sequence, with controlling mechanism by means of which each step of the sequence is controlled and initiated automatically, the controlling mechanism being governed wholly or partially by the level of the liquid in the machine through a float operating in a chamber connected with the interior of the machine.

According to the present invention the sequence of operation is initiated by a time obstruction and controlled by a series of cams mounted on a common shaft or similar device adapted to be driven intermittently by ratchet and pawl mechanism, the pawl of which is carried by a continuously oscillating member and is normally maintained out of engagement with the ratchet until at such time as before the completion of a return stroke of the oscillating member an obstruction is introduced into the path of the pawl causing it to move the ratchet on the next forward stroke of the oscillating member and impart a rotary movement to the cam shaft.

The obstruction controlling the engagement of the pawl with the ratchet may be actuated in various ways, for example it may be actuated as a result of the completion of an operation or of a stage in a sequence of operations, or after the elapse of a predetermined time from a datum, for instance an obstruction may be introduced as a result of a float rising or falling to a predetermined level as a result of a rotary element making a predetermined number of revolutions, as a result of a clockwork device being released and working for a predetermined period and so on, whilst in some cases one obstruction may be introduced from one such cause and another obstruction from another such cause.

The invention will be described with reference to the accompanying drawings in which it is shown applied to a laundry washing machine. In these drawings:

Fig. 1 is a front view of one end of a washing machine, showing the invention applied thereto.

Fig. 2 is a side view of same showing part of the controlling mechanism in section.

Fig. 4 is a part side elevation of same looking in the reverse direction.

Figure 9:
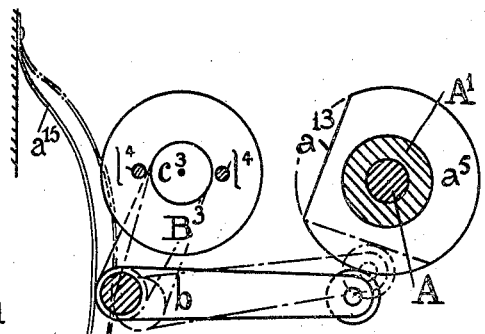
Figure 6:
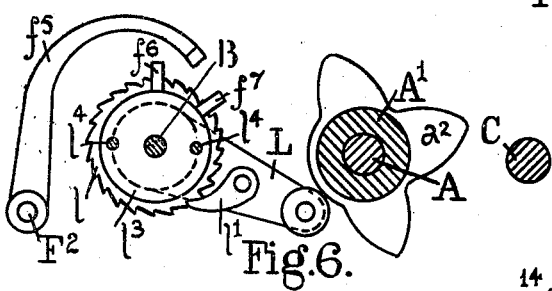
Figure 8:
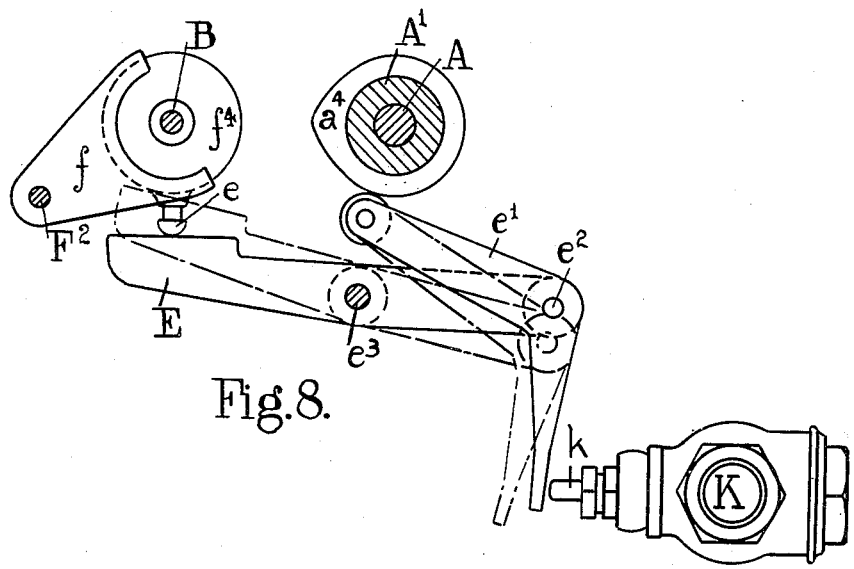
Figure 7:
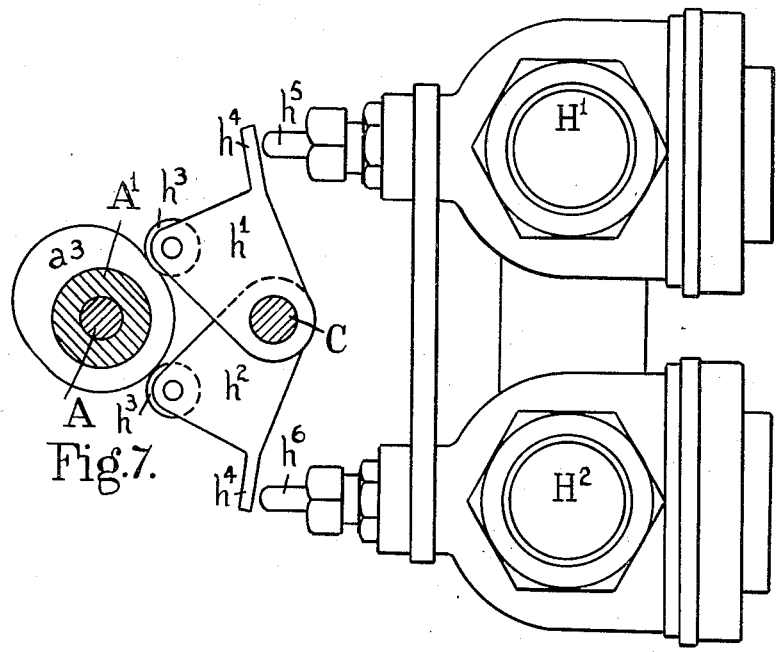

Figs. 5 to 9 are plan views of the various cams on the cam shaft which operate the valves or mechanisms necessary for carrying out the sequence of operations of the machine. In these views Fig. 5 is a plan of the cam $a^1$ controlling the drain valve, Fig. 6 is a plan of the cam $a^2$ which controls a series of tripping pieces, Fig. 7 is a plan of the cam $a^3$ which controls hot and cold water supply valves and Fig. 8 is a plan of the cam $a^4$ which controls a steam valve and also shows the means for rendering such valve inoperative and Fig. 9 is a plan of the cam $a^5$ which moves the obstruction to the pawl which has caused the operation of the cam shaft to an inoperative position.

Figure 10:
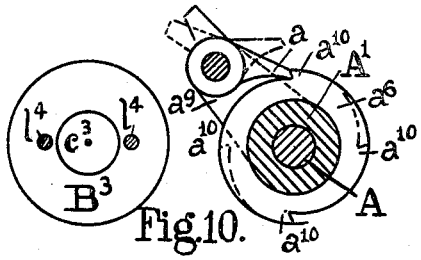

Fig. 10 is a plan of the operating ratchets and pawls.

Figure 11:
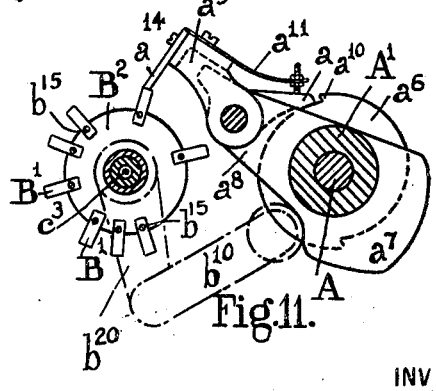

Fig. 11 is a plan of the pawl carrier and time obstruction cam.

Figure 12:
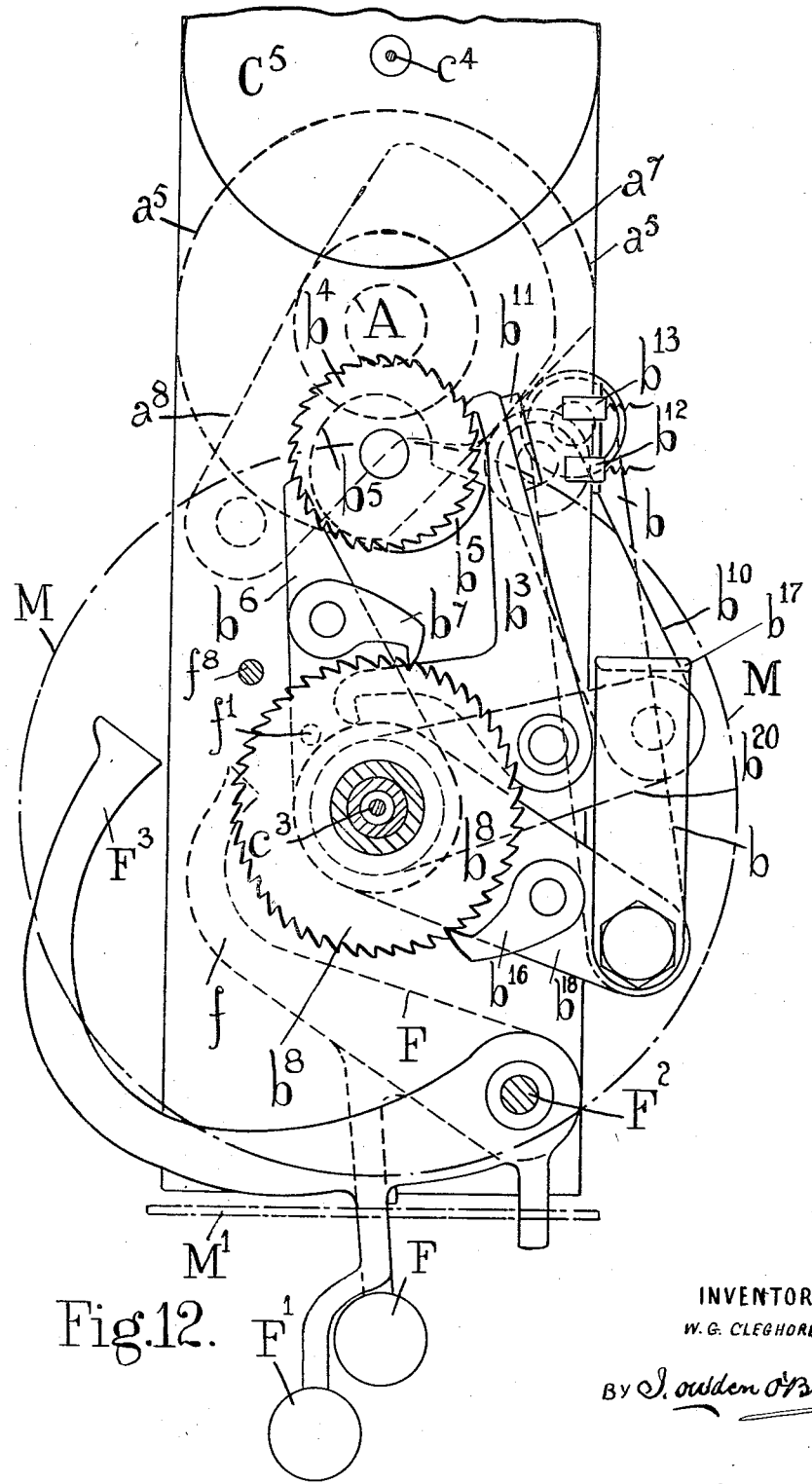

Fig. 12 is a plan of the time control mechanism enlarged.

Fig. 13 is a side view of float rod and tripping piece shaft showing the indicator striker and tripping piece.

Figure 14:
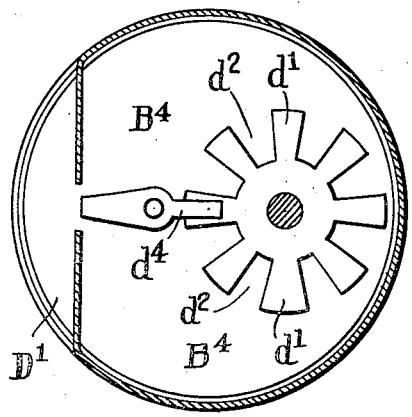

Fig. 14 is a plan of Fig. 13.

Figure 15:
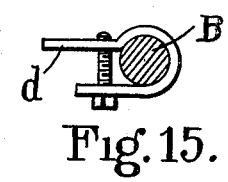

Fig. 15 is a plan of a tripping piece $d$.

Fig. 16 is a plan of the electrical contacts for giving an audible and/or visual signal at a certain stage in the operations for the introduction of soap or other detergent.

Figure 17:
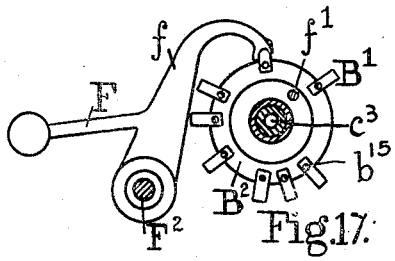

Fig. 17 is a plan of the lever for resetting the mechanism at the termination of a sequence of operations.

To facilitate comprehension of the various parts of the mechanism and of their functions the following brief description of a typical washing process is given as carried out on a laundry washing machine of the usual type provided with a drain valve, a cold water valve, a hot water valve and a steam valve it being necessary that soap and/or soda or other detergent is added to the machine at predetermined times in the sequence of operation.

The complete washing process is divided into a number of stages as follows:

*1st stage (breakdown of dirt)*

(a) The drain valve is opened and the machine emptied.
(b) The drain valve is closed and the cold water valve is opened.

(c) The cold water valve is closed and the hot water valve is opened.

(d) The hot water valve is closed.

(e) Soap and/or soda or other detergent is added to the water in the machine.

(f) The goods are washed for a predetermined time.

*2nd stage (1st wash)*

The first stage is repeated with modifications of the quantities of hot and cold water and length of time of washing.

*3rd stage (2nd wash)*

This is a repetition of the second stage (1st wash).

*4th stage (3rd wash)*

In this stage no cold water is used, hot water being supplied after the drain valve is closed and steam is admitted after the hot water valve is closed to bring the water to the boil.

*5th and subsequent stages (rinses)*

Hot and cold water are supplied in varying proportions and amounts and during the last rinse cold water only is required.

For the treatment of articles where boiling is not necessary or inadvisable the 4th stage (3rd wash) is omitted.

The washing machine is of known type containing a horizontal drum $I$ which is continuously rotated first in one direction and then in the opposite direction within a casing 2. The shaft $I^a$ of the drum $I$ is connected by means of a crank 4 and connected rod 3 to a vertical shaft A in such a way that the shaft A receives a regular oscillating movement as the drum $I$ rotates. This shaft A having a regular oscillating movement forms the drive for operating the various valves and mechanisms for carrying out the sequence of operations of the process in the machine.

The following is a short description of the timing and sequence of operations of the machine the details of which will be described hereafter.

The shaft A carries at its upper end a pawl $a$ adapted to engage a ratchet wheel $a^6$ on the sleeve $A^1$. A member $B^2$ referred to as the time obstruction carrying projections $B^1$ is initially set manually to cause one of the projections $B^1$ to initiate operation by causing the pawl $a$ to engage the ratchet $a^6$ after which the pawl is moved to an inoperative position. A float D then comes into play to cause obstruction means referred to as the float obstruction $B^3$ to intermittently come into play to move the pawl $a$ into position to further operate the cam shaft $A^1$ intermittently. After a number of such intermittent movements of the cam shaft $A^1$ a time obstruction cam $a^5$ comes into action and causes intermittent step by step movement of a tripping shaft B until another projection $B^1$ comes into action to effect engagement of the pawl $a$ and rotation of the cam shaft $A^1$. Similar cycles follow until all or the required number of projections $B^1$ have effected operation of the cam shaft $A^1$ after which the entire operation ceases until the time obstruction $B^2$ is reset. A more detailed description of the apparatus will now follow:—

The pawl $a$ is formed in two parts mounted on a pawl carrier $a^8$ (see Figs. 4 and 11) one or other part of which is adapted to engage the ratchet wheel $a^6$ which is formed in two parts mounted one below the other on the cam shaft $A^1$. Each ratchet wheel $a^6$ is formed with two diametrically opposite teeth $a^{10}$ the teeth on one wheel being arranged at an angle of 90° to the teeth on the other wheel so that on each oscillation of the shaft A the cam shaft $A^1$ will be moved through 90° provided the pawl $a$ has been caused to assume a position to bring it into engagement with a tooth $a^{10}$ on one of the ratchet wheels $a^6$.

The pawls $a$ are pivotally mounted on the pawl carrier $a^8$ and are normally out of engagement with the radial faces of the teeth $a^{10}$ of ratchet wheel $a^6$ until pressed into engagement by a block $B^1$ on a disc $B^2$ engaging a projection $a^{12}$, $a^{13}$ or $a^{14}$ on the pawl carrier $a^8$ the pawls $a$ riding over the teeth on the return stroke of the pawl carrier $a^8$ after they have been pressed into engagement with the said teeth. The spring $a^{11}$ only acts as a buffer spring to prevent the pawl chattering.

The spring $a^{11}$ is carried on an arm $a^9$ which is pivotally mounted on the carrier $a^8$ the normal position of the arm $a^9$ being such that the spring $a^{11}$ does not press the pawls $a$ into engagement with the teeth $a^{10}$ of the ratchet wheels $a^6$. The arm $a^9$ is provided with three projections $a^{12}$, $a^{13}$ and $a^{14}$ (see Fig. 4) the projection $a^{14}$ is engaged by one of a number of projections $B^1$ on the "time obstruction" disc $B^2$ to bring pawls $a$ into engagement with the teeth of the ratchet wheel $a^6$. On the return stroke of the pawl carrier $a^8$ the pawl $a$ rides up the inclined face of the ratchet wheel $a^6$ and does not engage behind the radial teeth $a^{10}$ until operated upon by a block $B^1$. The blocks $B^1$ are adjustably mounted on the disc $B^2$ to enable the angular distance between any pair to be adjusted for varying the timing of the different operations, such adjustment being made by the screws $b^{15}$. It will thus be evident that the cam shaft $A^1$ will be rotated through 90° each time the pawls $a$ are operated by a block $B^1$ on the disc $B^2$ to cause them to engage a tooth on one of the ratchet wheels $a^6$. The operation of this "time obstruction" disc $B^2$ will be more fully described later.

The number and contour of the cams carried on the cam shaft $A^1$ depends on the various valves and mechanism which are to be controlled thereby and the particular construction shown in the drawings comprises a cam $a^3$ controlling the opening and closing of cold and hot water supply valves $H^1$ and $H^2$ for admitting water to the casing of the machine (see Fig. 7) a cam $a^4$ for opening and closing a steam valve K (see Fig. 8) for supplying steam to the machine, when the temperature required at any stage is higher than that of the water, a cam $a^1$ to open and close the drain valve of the machine (see Fig. 5) a cam $a^5$ for rendering operative or inoperative the mechanism for actuating the "time obstruction" disc $B^2$ (see Fig. 9) and a cam $a^2$ controlling the operation of the tripping piece shaft B (see Fig. 6) the function and operation of which will be more fully described.

The cam $a^1$ controlling the drain valve $M^2$ (see Fig. 5) is a simple single peak cam which operates the arm $c$ on the vertical shaft C once for every revolution of the cam shaft $A^1$, the shaft C is connected to the drain valve $M^2$ so that the latter is opened by the movement of the shaft and held open a sufficient length of time to drain off the contents of the casing of the machine.

A single cam $a^3$ (see Fig. 7) controls the cold water supply valve $H^1$ and the hot water supply valve $H^2$. The cam $a^3$ is a simple single peak cam which controls two pivoted arms $h^1$ and $h^2$ each carrying a roller $h^3$ in contact with the face of the cam and each having a projection $h^4$ to engage the spring controlled stem $h^5$ or $h^6$ of the valves $H^1$ or $H^2$ and open the valve.

Figure 3:
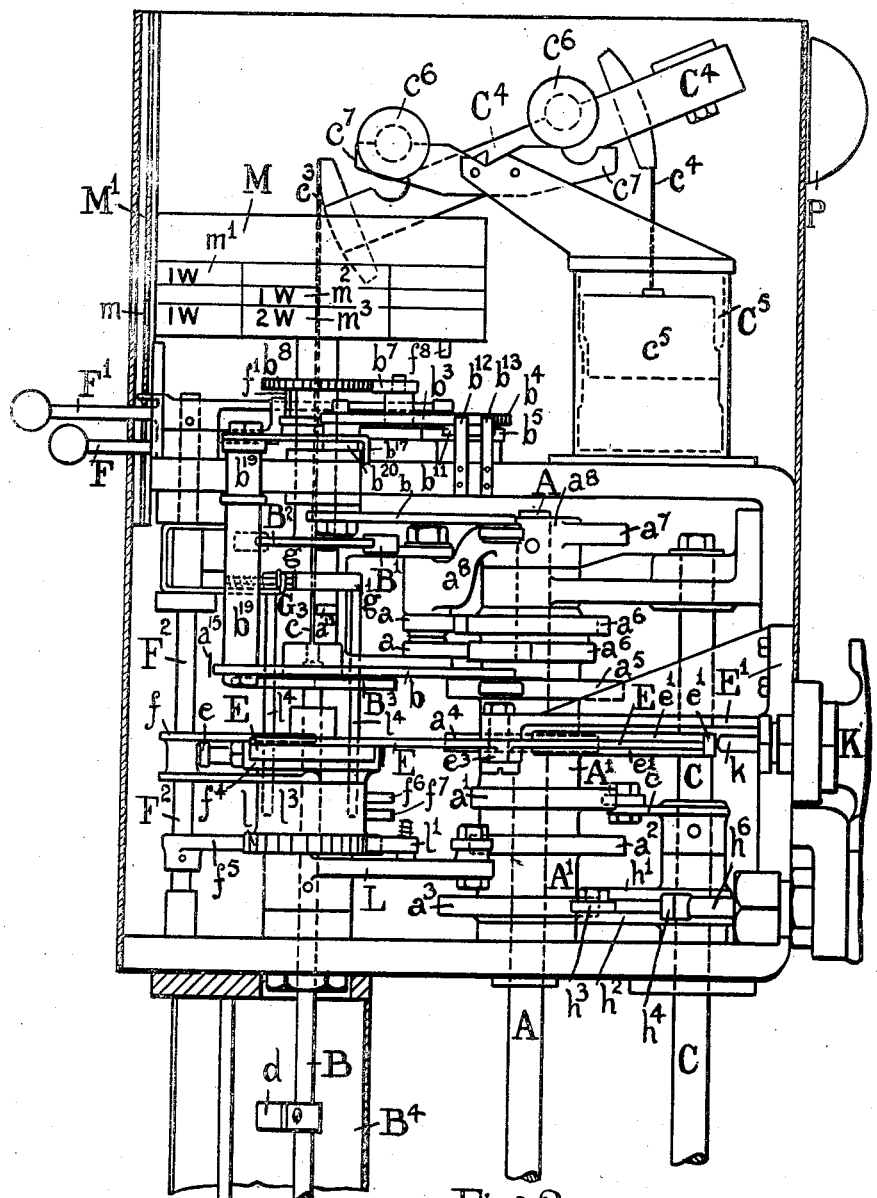
Fig. 3 is a side elevation looking in the direction of the arrow $y$ Fig. 1 of the cam mechanism and timing mechanism.

The steam control cam $a^4$ (see Fig. 8) is also a single peak cam which operates the spring controlled stem $k$ of the steam valve K through the bell crank lever $e^1$ which is pivotally mounted at $e^2$ on an arm E pivotally mounted at $e^3$ on a fixed pivot carried by the bracket $E^1$ (see Fig. 3).

This arm E is normally in the position shown in dotted lines in Fig. 8 when the fulcrum $e^2$ of the lever $e^1$ is in such a position that the oscillation of the lever $e^1$ will not operate the valve and it is only when the arm E is moved into the position shown in full lines by the projection $e$ on the sleeve $f^4$ that the valve K will be operated.

Above the cam $a^4$ is the "time obstruction" cut out cam $a^5$ (see Fig. 9) which renders operative or inoperative the mechanism for operating the "time obstruction" disc $B^2$ which in turn as previously described controls the engagement of the pawls $a$ carried by the shaft A with the teeth of the ratchets on the cam shaft $A^1$.

The cam $a^5$ has a flat portion $a^{13}$ (or portion of reduced radius) which controls the time obstruction operating arm comprising a vertical pillar $b^{19}$, horizontal arm $b$ and horizontal lever $b^{17}$. When the time obstruction operating arm moves inwards under the action of a spring it brings the end of a pivoted arm $b^{10}$ (the time obstruction arm) into engagement with the face of a cam $a^7$ carried by the oscillating pawl carrier $a^8$ (see Figs. 11 and 12) so that the arm $b^{10}$ is oscillated by the cam $a^7$. The time obstruction arm $b^{10}$ craries a pawl $b^3$ which rotates a ratchet wheel $b^4$ carrying a cam $b^5$ of spiral shape. The cam $b^5$ controls the outer end of an arm $b^6$ capable of oscillation about the axis of the time obstruction disc $B^2$ and carrying a pawl $b^7$ which cooperates with a second ratchet wheel $b^8$ affixed to the time obstruction disc $B^2$.

As the ratchet wheel $b^4$ rotates, driven by the time obstruction arm $b^{10}$, the arm $b^6$ carrying the pawl $b^7$ moves slowly outwards and at the end of one revolution of the ratchet wheel $b^4$ the arm $b^6$ drops quickly back on to the point of smallest radius of the cam $b^5$ causing the pawl $b^7$ to rotate the ratchet wheel $b^8$ and with it the time obstruction disc $B^2$ an amount equal to one tooth of the ratchet wheel.

The time obstruction disc $B^2$ has clamped thereto by the screws $b^{15}$ and extending beyond its periphery a number of thin blocks or projections $B^1$ (see Fig. 11) which as previously described engage the projection $a^{14}$ of the arm $a^9$ carrying the spring $a^{11}$ which causes the engagement of the pawls $a$ with the teeth of the ratchet wheels $a^6$ on the cam shaft $A^1$ so that the latter is operated a corresponding number of times to the number of blocks $B^1$ for each revolution of the time obstruction disc $B^2$. As the number in the sequence of operations for carrying out the stages of the process hereinbefore outlined is eight there are eight obstruction blocks $B^1$ on the disc $B^2$ spaced at varying distances apart according to the time required between each operation so that the cam shaft $A^1$ is moved through 90° eight times at varying intervals of time for each revolution of the time obstruction disc $B^2$.

The advancing of the cam shaft $A^1$ causes the time obstruction cut out cam $a^5$ to move the time obstruction actuating arm $b^{10}$ through the lever $b^{20}$ away from the time obstruction cam $a^7$ on the pawl carrier $a^8$ (see Fig. 11) thus suspending any further movement of the ratchet $b^4$, and at the same time a pawl $b^{16}$ carried by a link $b^{18}$ on the arm $b$ is caused by the outward movement of the latter to move the ratchet wheel $b^8$ one tooth thereby moving the block $B^1$ of the time obstruction disc into or out of the path of the arm $a^9$ moving the pawls $a$ into or out of operative position to drive the cam shaft $A^1$ or preventing further movement of the latter.

The operation of alternately moving the pawls $a$ into and out of engagement with the ratchets $a^6$ takes place as each block $B^1$ engages and moves away from the arm $a^9$ but since the disc and block $B^1$ could not be again rotated through the cam shaft after a block $B^1$ has moved away from the arm $a^9$ the whole series of operations would cease unless a second obstruction disc controlled by a second factor were employed to operate the arm $a^9$ carrying the pawls $a$. This second disc is the disc $B^3$, which may be called the float obstruction disc for reasons which will appear later and is carried on a tripping piece shaft B (see Figs. 2, 3 and 4).

The shaft B is controlled by the cam $a^2$ (see Fig. 6) arranged on the cam shaft $A^1$ above the cam $a^3$ the cam $a^2$ being formed with three peaks which will operate an arm L carrying a pawl $l^1$ three times for each revolution of the cam shaft $A^1$. The pawl $l^1$ drives a ratchet $l$ on a sleeve $l^3$ from which a pair of guide rods $l^4$ project parallel with its axis of rotation. The rods $l^4$ serve as guides for the vertical movement of the float obstruction disc $B^3$ which is attached by the cable $c^3$ to one arm of a balanced beam $C^4$, the other arm of which is attached by a cable $c^4$ to the piston $c^5$ of a dashpot device $C^5$ having its ports so arranged that its retarding action is practically nil at the last part of its stroke.

The beam $C^4$ which carries the tripping piece shaft B and the dash pot piston $c^5$ has a rider $c^6$ at each side of the fulcrum, each rider resting on the beam, the weight of the rider being taken off the beam by a fixed carrier $c^7$ when the arm of the beam descends below the horizontal.

The effect of these riders is as follows:

When the tripping piece shaft B is not influenced by the striker $d^4$ of the float rod the beam $C^4$ is balanced and assumes a horizontal position. If through any cause the beam tends to leave this position it will pick up one or other of the riders $c^6$ and will therefore become unbalanced. The riders thus ensure that the beam is normally horizontal and the float obstruction disc $B^3$ cannot accidentally actuate either of the projections $a^{12}$ or $a^{13}$ on the pawl carrier $a^8$.

When the machine is empty of liquid and the weight of the float acts on the tripping plate $d^1$ the beam $C^4$ becomes unbalanced and the tripping piece shaft B falls, the weight of the float D overcoming the weight of the rider $c^6$ on the right hand side of Fig. 3 which is now picked up by the back arm of the beam whilst the rider $b^6$ on the left hand side rests on the carrier $c^7$.

Similarly when liquid enters the machine and the striker $d^4$ comes in contact with any one of the tripping pieces $d$ the buoyancy of the float D overcomes the weight of the rider $c^6$ which is picked up by the front arm of the beam.

The tripping piece shaft B extends downwards into a chamber $B^4$ and the portion of the shaft situated in such chamber has adjustably clamped thereto in spaced relationship both angularly and longitudinally, a plurality of tripping pieces $d$ which are arranged at heights on the shaft corresponding with the depths of cold and hot water to be admitted to the casing of the washing machine during succeeding steps of the process. Near the bottom of the shaft B is a tripping plate $d^1$ in the form of a disc with a number of gaps $d^2$ corresponding in number with the number of blocks $B^1$ on the time obstruction disc $B^2$ (see Figs. 13 and 14). In the present construction there are eight gaps $d^2$ to correspond with the eight blocks on the time obstruction disc $B^2$.

The tripping plate $d^1$ and anyone of the tripping pieces $d$ according to the angular position of the shaft B are adapted to project into the path of a striker $d^4$ carried by a float D arranged in a float chamber $D^1$ which is in communication with the interior of the casing 2 of the washing machine so that the float D will rise and fall with the level of the water in the said casing. Thus as the tripping piece shaft cam $a^2$ rotates the tripping piece shaft B to bring the tripping pieces $d$ successively into operative position in the path of the striker $d^4$, the latter as the float D rises will engage a tripping piece, raise the tripping piece shaft B and with it the float obstruction disc $B^3$ into the path of the middle projection $a^{13}$ on the arm $a^9$ controlling the pawls $a$ driving the ratchet wheels on the cam shaft $A^1$ and cause the pawls $a$ to engage the teeth of the ratchet wheels $a^6$ to advance the cam shaft $A^1$ until the time obstruction disc cut out cam $a^5$ again controls the time obstruction disc $B^2$.

During the last movement of the cam shaft the time obstruction cut out cam $a^5$ comes into operation and the time obstruction disc actuating mechanism functions whilst the drum 1 of the machine rotates, until after a given number of revolutions of the drum 1 during which washing is taking place, a block $B^1$ on the time obstruction disc $B^2$ again operates the pawls and brings about a further advancement of the cam shaft $A^1$ to cause the drain valve cam $a^1$ to open the drain valve $M^2$ as the first operation of the succeeding stage. Thereupon the casing of the machine empties and the float D falls and the striker $d^4$ engages the tripping plate $d^1$ near the bottom of the tripping piece shaft B which latter, together with the float obstruction disc $B^3$ is thus pulled down against the action of the dashpot device $C^5$.

The action of the dashpot serves to retard the downward movement of the float obstruction disc $B^3$ and to hold the drain valve open for a short time (even though the casing has discharged) thus permitting the escape of water as it drains from the articles in the drum, but towards the end of the stroke of the piston $C^5$ in the dashpot the port arrangement permits a rapid final movement to close the drain valve. During this rapid final movement the float obstruction disc $B^3$ is lowered into the path of the bottom projection $a^{12}$, to bring about a further advance of the cam shaft $A^1$ so as to close the drain valve $M^2$ and open the cold water valve $H^1$ and at the same time to rotate the tripping piece cam $a^2$ to operate the tripping piece shaft B to bring the appropriate tripping piece $d$ into the path of the striker $d^4$. The consequent raising of the float obstruction disc $B^3$ will advance the cam shaft $A^1$ through 90° and bring the cold and hot water control cam $a^3$ into position to shut off the cold water and to admit hot water and also bring the tripping shaft control cam $a^2$ into operation to cause the rotation of the shaft B to bring into operative position another tripping piece $d$ which will be engaged by the striker $d^4$ when the float D again rises.

Between the shutting off of the cold water valve $H^1$ and the engagement of the striker with the tripping piece appertaining to the hot water valve $H^2$ the float obstruction disc $B^3$ is released by the rotation of the shaft B and under the influence of the balanced beam $C^4$ it returns to its normal position, in which it does not act as an obstruction, but when, due to the inflow of hot water the striker engages the hot water tripping piece $d$ the tripping piece shaft B is raised again and the float obstruction disc $B^3$ is again moved into the path of the arm $a^{13}$ controlling the main driving pawls $a$ to bring about the cutting off of the hot water, and at the same time the shaft B is further rotated by the cam $a^2$ so that the float obstruction disc $B^3$ again falls and the pawls $a$ oscillate idly without driving the cam shaft $A^1$.

As during successive stages the temperature of the water is to be varied the sleeve $f^4$ is provided with one or more projections $e$ (see Fig. 8) serving to convert said sleeve into a cam, which, at the appropriate moments, acts on the lever E on which is pivoted the steam valve lever $e^1$ so that as before described the fulcrum $e^2$ of the latter is shifted and the effect of the steam valve cam $a^4$ on its lever, and hence on the steam valve K is to open the steam valve K. The steam valve K is opened fully by the projection $e$.

At the end of the timing operation of the last stage in the sequence of operations, a peg $f^1$ carried on the side of the ratchet wheel $b^8$ is brought into a position such that it interferes with a tail piece on the pawl $b^3$ preventing this from rotating the ratchet wheel $b^4$ and so stopping any further movement of the time obstruction disc $B^2$. At the same time audible and/or visual warning such as by bell P of the completion of the process is given by a bridge piece $b^{11}$ carried by the lever $b^3$ touching contacts $b^{12}$ and $b^{13}$ intermittently. This will continue indefinitely so long as the washing machine is kept running since the lever $b^3$ will continue to oscillate.

Sequence of operations is restarted by moving the end $f$ of the lever F to engage a pin $f^1$ on the wheel $b^8$ carried by the time obstruction disc $B^2$ to bring the first time obstruction block $B^1$ into register with a projection $a^{14}$ on a pawl carrier $a^3$. If the lever F is not moved the washing machine may be used without the automatic feature, hot and cold water, steam and drain valves being opened and closed manually.

In the ordinary way the manual opening of the drain valve and consequent draining of the machine would bring the float obstruction disc $B^3$ down to register with a projection $a^{12}$ thus restarting sequence of operations, and to prevent this a springy strip of steel $a^{15}$ see Fig. 9 is attached to the front plate of the apparatus and bears on the time obstruction operating arm $b$ so that the free end of the strip moves with the arm.

When the time obstruction operating arm $b$ is in the "timing" position, this strip stands in the path of the float obstruction disc, preventing its moving downwards. When the lever F is moved, the cam shaft $A^1$ is caused to rotate, throwing the time obstruction operating arm out of the "timing" position and moving the strip clear of the float obstruction disc $B^3$ so that the latter is free to fall and restart the sequence of operations.

In a machine in which it is required to pre-select three separate series of operations the shaft $F^2$ is capable of sliding vertically being operated by a lever $F^1$ and on an extension of the spindle carrying ratchet $b^8$ and time obstruction disc $B^2$ is a drum indicator M formed with three series of indications $m^1$, $m^2$, $m^3$, each representing one of the series. Thus if the first series $m^3$ has eight operations viz: breakdown 1B, first wash 1W, second wash 2W, third wash 3W, first rinse 1R, second rinse 2R, third rinse 3R and fourth rinse 4R and each of the other series $m^2$ and $m^1$ omits one or more of the eight operations the drum M in development would indicate as follows:

| $m^1$ | 1B | 1W |    |    | 2W | 1R | 2R | 3R | 4R |
|-------|----|----|----|----|----|----|----|----|----|
| $m^2$ | 1B |    |    | 1W | 2W | 1R | 2R | 3R | 4R |
| $m^3$ | 1B | 1W | 2W | 3W |    | 1R | 2R | 3R | 4R |

A mask $M^1$ connected to the shaft $F^2$ is moved by the movement of the shaft $F^2$ to coincide with any one of the three series of indications so that by setting the mask to bring the aperture $m$ thereon into register with the desired series of operations on the drum $M^2$ such will be commenced on operation of the lever F.

The lever $F^1$ also carries a curved arm $F^3$ which can be brought into engagement with stop $f^8$ on the drum M by which the latter can be rotated to reset it to start the next step in the series of operations.

The shaft $F^2$ carries a fork $f$ (Fig. 8) which slides the sleeve $f^4$ carrying the projection $e$ out of the path of the lever E thereby rendering the steam cam $a^4$ inoperative as before described during any stage such as the fourth when steam is not required.

The shaft $F^2$ also carries a curved lever $f^5$ (see Fig. 6) which engages pegs $f^6$ and $f^7$ on the ratchet $l$ rotating the tripping piece shaft B when the shaft $F^2$ is in either of its second or third positions i. e. for 1st and 2nd wash stages so that on rotation of the shaft $F^2$ by the lever F the shaft B is rotated to omit one or more of the tripping pieces $d$ from the series of operations.

The shaft $F^2$ also carries an electric contact G in the path of a contact maker $g$ mounted on a ring $g^1$ carried on the tripping piece shaft B to close a circuit to give an audible and/or visible warning at the point in the process when soap and/or soda or other detergent should be added to the machine.

The following sequence of movements illustrated one stage, 1st wash or 2nd wash of the operations:

1. The time obstruction block $B^1$ is brought into path of top projection of pawl carried $a^9$ tilting the pawls $a$ and operating the cam shaft ratchet $a^6$.

The camshaft A rotates through 90° and:
 (a) Drain valve M is opened.
 (b) Time obstruction cut-out cam $a^5$ comes into operation and through levers and pawl rotates the time obstruction block $B^1$ out of the path of the pawl carrier $a^9$.

The float D falls and the striker $d^4$ engaging the tripping plate $d^1$ draws the float obstruction disc $B^3$ down into the path of the bottom projection $a^{12}$ of the pawl carrier $a^9$.

2. The camshaft $A^1$ rotates through 90° and:
 (a) Drain valve M is closed;
 (b) Cold water valve $H^1$ is opened.
 (c) Tripping piece shaft B is rotated, allowing the striker $d^4$ to fall through the slot in the lowest tripping plate $d^1$ and causing the float obstruction $B^3$ to rise to its normal position.

The float D rises as water enters the machine, until the striker $d^4$ engages a tripping piece $d$ raising the float obstruction disc $B^3$ into the path of the middle projection $a^{13}$ of the pawl carrier $a^9$.

3. The camshaft $A^1$ again rotates through 90° and:
 (a) Cold water valve $H^1$ is closed.
 (b) Hot water valve $H^2$ is opened.
 (c) Tripping piece shaft B is rotated, releasing the striker from the tripping piece $d^1$ allowing the float obstruction disc $B^3$ to fall to its normal position.

The float D again rises until the striker $d^4$ engages a higher tripping piece $d$, again raising the float obstruction disc $B^3$ into the path of the middle projection $a^{13}$ of the pawl carrier $a^9$.

4. The camshaft $A^1$ rotates through a further 90° and:
 (a) Hot water valve $H^2$ is closed.
 (b) Electrical contacts G close, signalling to operator to introduce soap, etc. (in washing processes).
 (c) Steam valve K is opened (if process requires it).
 (d) The obstruction cut-out cam $a^5$ allows time obstruction actuating arm to function and timing recommenced.
 (e) Tripping piece shaft B is rotated, releasing the striker $d^4$ from tripping piece and allowing float obstruction $B^3$ to fall to its normal position.

What I claim as my invention and desire to protect by Letters Patent is:

1. Means for controlling the timing and sequence of operations in machines of the type referred to having a variable liquid level comprising a continuously oscillating shaft, a series of cams and a ratchet wheel loosely mounted for movement together on the oscillating shaft, a pawl carried by the oscillating shaft for intermittently rotating the ratchet wheel and cams simultaneously, a time obstruction, projecting members on the time obstruction arranged to be operative successively, one of which is initially manually set to initiate operation by causing the pawl to engage the ratchet and means for subsequently moving the pawl to an inoperative position, a float obstruction controlled by the level of liquid in the machine to intermittently come into play to move the pawl into position to further operate the ratchet wheel and cams intermittently between operations by the projecting members on the time obstruction and means operable by one of the cams to continue operation of the controlling means to bring the next successive projecting member of the time obstruction into operation after an operation of the cams by the float obstruction.

2. Means for controlling the timing and sequence of operations in machines of the type referred to having a variable liquid level comprising a continuously oscillating shaft, a series of cams and a ratchet wheel loosely mounted for movement together on the oscillating shaft, a pawl carried by the oscillating shaft for intermittently rotating the ratchet wheel and cams simultaneously, a time obstruction, projecting members on the time obstruction arranged to be operative successively, one of which is initially manually set to initiate operation by causing the pawl to engage the ratchet and means for subsequently moving the pawl to an inoperative position, a float obstruction controlled by the level of liquid in the machine to intermittently come into play to move the pawl into position to further operate the ratchet wheel and cams intermittently between operations by the projecting members on the time obstruction means operable by one of the cams to continue operation of the controlling means to bring the next successive projecting member of the time obstruction into operation after an operation of the cams by the float obstruction and means for stopping the operation of the machine after a series of cycles have been carried out by a plurality of the projecting members on the time obstruction.

3. Means for controlling the timing and sequence of operations in machines of the type referred to having a variable liquid level comprising a continuously oscillating shaft, a common cam shaft surrounding the oscillating shaft, a series of cams and a ratchet wheel mounted for movement together on the cam shaft, a pawl carried by the oscillating shaft for intermittently rotating the ratchet wheel and cam shaft, a time obstruction projecting members on the time obstruction arranged to be operative successively, one of which is initially manually set to initiate operation by causing the pawl to engage the ratchet and means for subsequently moving the pawl to an inoperative position, a float obstruction controlled by the level of liquid in the machine to intermittently come into play to move the pawl into position to further operate the cam shaft intermittently between operations by the time obstruction means operable by one of the cams to continue operation of the controlling means to bring the next successive projecting member of the time obstruction into operation after an operation of the cams by the float obstruction, a vertical shaft carrying a series of angularly and vertically spaced tripping pieces and the float obstruction, an arm on the vertical shaft, a cam on the common cam shaft engaging the arm to rotate the vertical shaft a float in a chamber connected to the water space in the machine, a vertically moving rod controlled by the float, a striker plate carried by said rod and positioned on the rising of the float to engage one or another of the tripping pieces carried on the vertical shaft according to the angular position of the said shaft and lift the said shaft and with it the float obstruction to engage the pawl and move it into engagement with the ratchet on the cam shaft whereby the latter is rotated when the float has risen to a level determined by the position of the tripping piece.

4. Means for controlling the timing and sequence of operations in machines of the type referred to having a variable liquid level comprising a continuously oscillating shaft, a common cam shaft surrounding the oscillating shaft, a series of cams and a ratchet wheel mounted for movement together on the cam shaft, a pawl carried by the oscillating shaft for intermittently rotating the ratchet wheel and cam shaft, a time obstruction projecting members on the time obstruction arranged to be operative successively, one of which is initially manually set to initiate operation by causing the pawl to engage the ratchet and means for subsequently moving the pawl to an inoperative position, a float obstruction controlled by the level of liquid in the machine to intermittently come into play to move the pawl into position to further operate the cam shaft intermittently between operations by the time obstruction means operable by one of the cams to continue operation of the controlling means to bring the next successive projecting member of the time obstruction into operation after an operation of the cams by the float obstruction, a vertical shaft carrying a series of angularly and vertically spaced tripping pieces and the float obstruction, an arm on the vertical shaft, a cam on the common cam shaft engaging the arm to rotate the vertical shaft, a float in a chamber connected to the water space in the machine, a vertically moving rod controlled by the float, a striker plate carried by said rod and positioned on the rising of the float to engage one or another of the tripping pieces carried on the vertical shaft according to the angular position of the said shaft and lift the said shaft and with it the float obstruction to engage the pawl and move it into engagement with the ratchet on the cam shaft whereby the latter is rotated when the float has risen to a level determined by the position of the tripping piece, a two armed balance beam supporting the tripping piece shaft and float obstruction, a dash pot connected to said beam, having its parts so arranged that its retarding action is practically nil at the last part of its stroke, a flexible connection connecting one arm of the balance beam to the tripping shaft and float obstruction and a second flexible connection connecting the other arm of the balance beam to the piston of the dash pot.

5. Means for controlling the timing and sequence of operations in machines of the type referred to having a variable liquid level comprising a continuously oscillating shaft, a common cam shaft surrounding the oscillating shaft, a series of cams and a ratchet wheel mounted for movement together on the cam shaft, a pawl carried by the oscillating shaft for intermittently rotating the ratchet wheel and cam shaft, a time obstruction projecting members on the time obstruction arranged to be operative successively, one of which is initially manually set to initiate operation by causing the pawl to engage the ratchet and means for subsequently moving the pawl to an inoperative position, a float obstruction controlled by the level of liquid in the machine to intermitently come into play to move the pawl into position to further operate the cam shaft intermittently between operations by the time obstruction means operable by one of the cams to continue operation of the controlling means to bring the next sucessive projecting member of the time obstruction into operation after an operation of the cams by the float obstruction, a vertical shaft carrying a series of angularly and vertically spaced tripping pieces and the float obstruction, an arm on the vertical shaft, a cam on the common cam shaft engaging the arm to rotate the vertical shaft, a float in a chamber connected to the water space in the machine, a vertically moving rod controlled by the float, a striker plate carried by said rod and positioned on the rising of the float to engage one or another of the tripping pieces carried on the vertical shaft according to the angular position of the said shaft and lift the said shaft and with it the float obstruction to engage the pawl and move it into engagement with the ratchet on the cam shaft whereby the latter is rotated when the float has risen to a level determined by the position of the tripping piece, a two armed balance beam supporting the tripping piece shaft and float obstruction, a dash pot connected to said beam having its parts so arranged that its retarding action is practically nil at the last part of its stroke, a flexible connection connecting one arm of the balance beam to the tripping shaft, a float obstruction and a second flexible connection connecting the other arm of the balance beam to the piston of the dash pot, a rider at each side of the fulcrum of the balance lever, each rider positioned to rest on the beam and a fixed bracket to take the weight of the rider off the beam when the corresponding arm of the latter descends below the horizontal.

6. Means for controlling the timing and sequence of operations in machines of the type referred to having a variable liquid level comprising a continuously oscillating shaft, a common cam shaft surrounding the oscillating shaft, a series of cams and a ratchet wheel mounted for movement together on the cam shaft, a pawl carried by the oscillating shaft for intermittently rotating the ratchet wheel and cam shaft, a time obstruction projecting members on the time obstruction arranged to be operative successively, one of which is initially manually set to initiate operation by causing the pawl to engage the ratchet and means for subsequently moving the pawl to an inoperative position, a float obstruction controlled by the level of liquid in the machine to intermittently come into play to move the pawl into position to further operate the cam shaft intermittently between operations by the time obstruction means operable by one of the cams to continue operation of the controlling means to bring the next successive projecting member of the time obstruction into operation after an operation of the cams by the float obstruction, a vertical shaft carrying a series of angularly and vertically spaced tripping pieces and the float obstruction, an arm on the vertical shaft, a cam on the common cam shaft engaging the arm to rotate the vertical shaft, a float in a chamber connected to the water space in the machine, a vertically moving rod controlled by the float, a striker plate carried by said rod and positioned on the rising of the float to engage one or another of the tripping pieces carried on the vertical shaft according to the angular position of the said shaft and lift the said shaft and with it the float obstruction to engage the pawl and move it into engagement with the ratchet on the cam shaft whereby the latter is rotated when the float has risen to a level determined by the position of the tripping piece, a valve supplying steam to the machine, a cam on the cam shaft controlling said valve, a bell crank lever through which the cam actuates the valve, the bell crank lever having a shifting fulcrum the position of which is normally such that the valve is not operated by the cam on the cam shaft and a second cam on the tripping piece shaft which causes the movement of the fulcrum of the bell crank lever to bring the latter into position to operate the valve.

7. Means for controlling the timing and sequence of operations in machines of the type referred to having a variable liquid level comprising a continuously oscillating shaft, a common cam shaft surrounding the oscillating shaft, a series of cams and a ratchet wheel mounted for movement together on the cam shaft, a pawl carried by the oscillating shaft for intermittently rotating the ratchet wheel and cam shaft, a time obstruction projecting members on the time obstruction arranged to be operative successively, one of which is initially manually set to initiate operation by causing the pawl to engage the ratchet and means for subsequently moving the pawl to an inoperative position, a float obstruction controlled by the level of liquid in the machine to intermittently come into play to move the pawl into position to further operate the cam shaft intermittently between operations by the time obstruction means operable by one of the cams to continue operation of the controlling means to bring the next successive projecting member of the time obstruction into operation after an operation of the cams by the float obstruction, a vertical shaft carrying a series of angularly and vertically spaced tripping pieces and the float obstruction, an arm on the vertical shaft, a cam on the common cam shaft engaging the arm to rotate the vertical shaft a float in a chamber connected to the water space in the machine, a vertically moving rod controlled by the float, a striker plate carried by said rod and positioned on the rising of the float to engage one or another of the tripping pieces carried on the vertical shaft according to the angular position of the said shaft and lift the said shaft and with it the float obstruction to engage the pawl and move it into engagement with the ratchet on the cam shaft whereby the latter is rotated when the float has risen to a level determined by the position of the tripping piece, and manually operated means for varying the timing and sequence of operations to provide for a plurality of differing series of operations being carried out any one of which may be pre-selected at the commencement of the sequence.

8. Means for controlling the timing and sequence of operations in machines of the type referred to having a variable liquid level comprising a continuously oscillating shaft, a common cam shaft surrounding the oscillating shaft, a series of cams and a ratchet wheel mounted on the cam shaft, a pawl carried by the oscillating shaft for intermittently rotating the ratchet wheel and cam shaft, a time obstruction projecting members on the time obstruction arranged to be operative successively, one of which is initially manually set to initiate operation by causing the pawl to engage the ratchet and means for subsequently moving the pawl to an inoperative position, a float obstruction controlled by the level of liquid in the machine to intermittently come into play to move the pawl into position to further operate the cam shaft intermittently between operations by the time obstruction means operable by one of the cams to continue operation of the controlling means to bring the next successive projecting member of the time obstruction into operation after an operation of the cams by the float obstruction, the cams on the cam shaft including a cam for controlling hot and cold water inlet valves and a cam for controlling a drain valve.

9. Means for controlling the timing and sequence of operations in machines of the type referred to having a variable liquid level comprising a continuously oscillating shaft, a common cam shaft surrounding the oscillating shaft, a series of cams and a ratchet wheel mounted for movement together on the cam shaft, a pawl carried by the oscillating shaft for intermittently rotating the ratchet wheel and cam shaft, a time obstruction projecting members on the time obstruction arranged to be operative successively, one of which is initially manually set to initiate operation by causing the pawl to engage the ratchet and means for subsequently moving the pawl to an inoperative position, a float obstruction controlled by the level of liquid in the machine to intermittently come into play to move the pawl into position to further operate the cam shaft intermittently between operations by the time obstruction means operable by one of the cams to continue operation of the controlling means to bring the next successive projecting member of the time obstruction into operation after an operation of the cams by the float obstruction, the cams on the cam shaft including a cam for controlling hot and cold water inlet valves, and a cam for controlling a drain valve, and means whereby the said valves can be controlled manually when automatic control is not desired.

WILLIAM GEORGE CLEGHORN.